Feb. 2, 1926. 1,571,673
A. R. JAYNE
AUTOMOBILE WHEEL FORMING PUNCH AND DIE
Filed Feb. 27, 1925    4 Sheets-Sheet 4
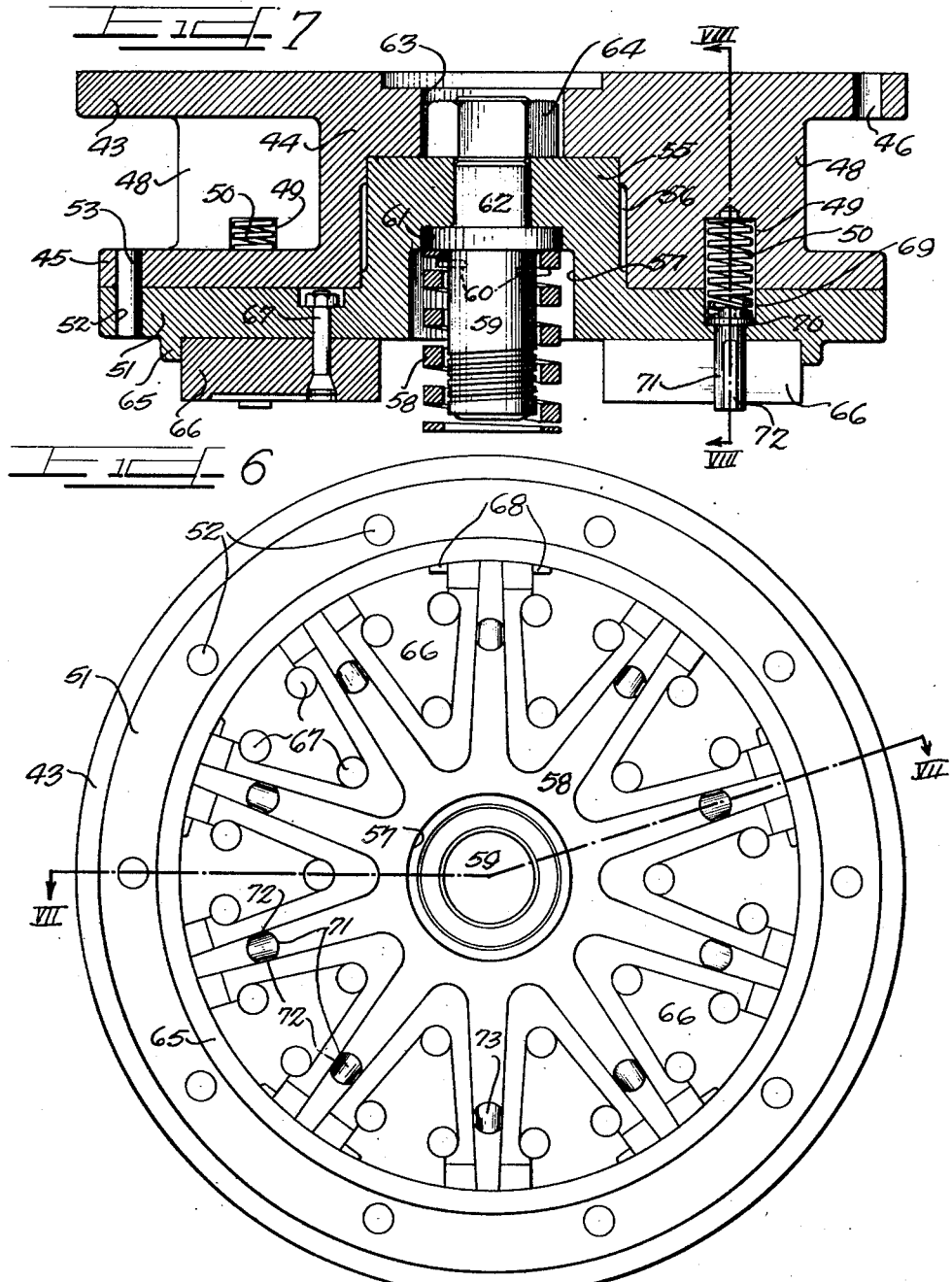
Inventor
Ames R. Jayne
By Charles...
Attys Patented Feb. 2, 1926.

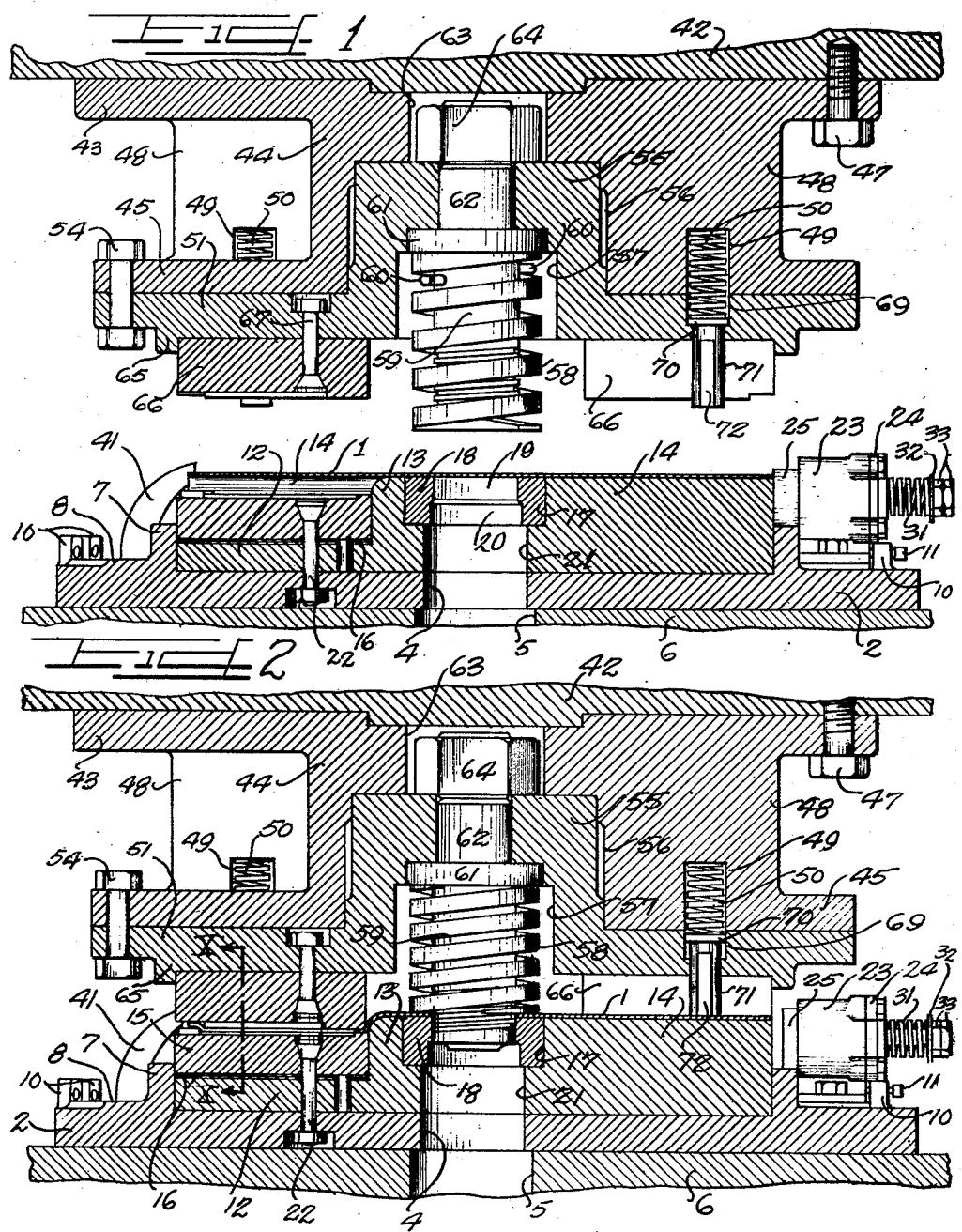

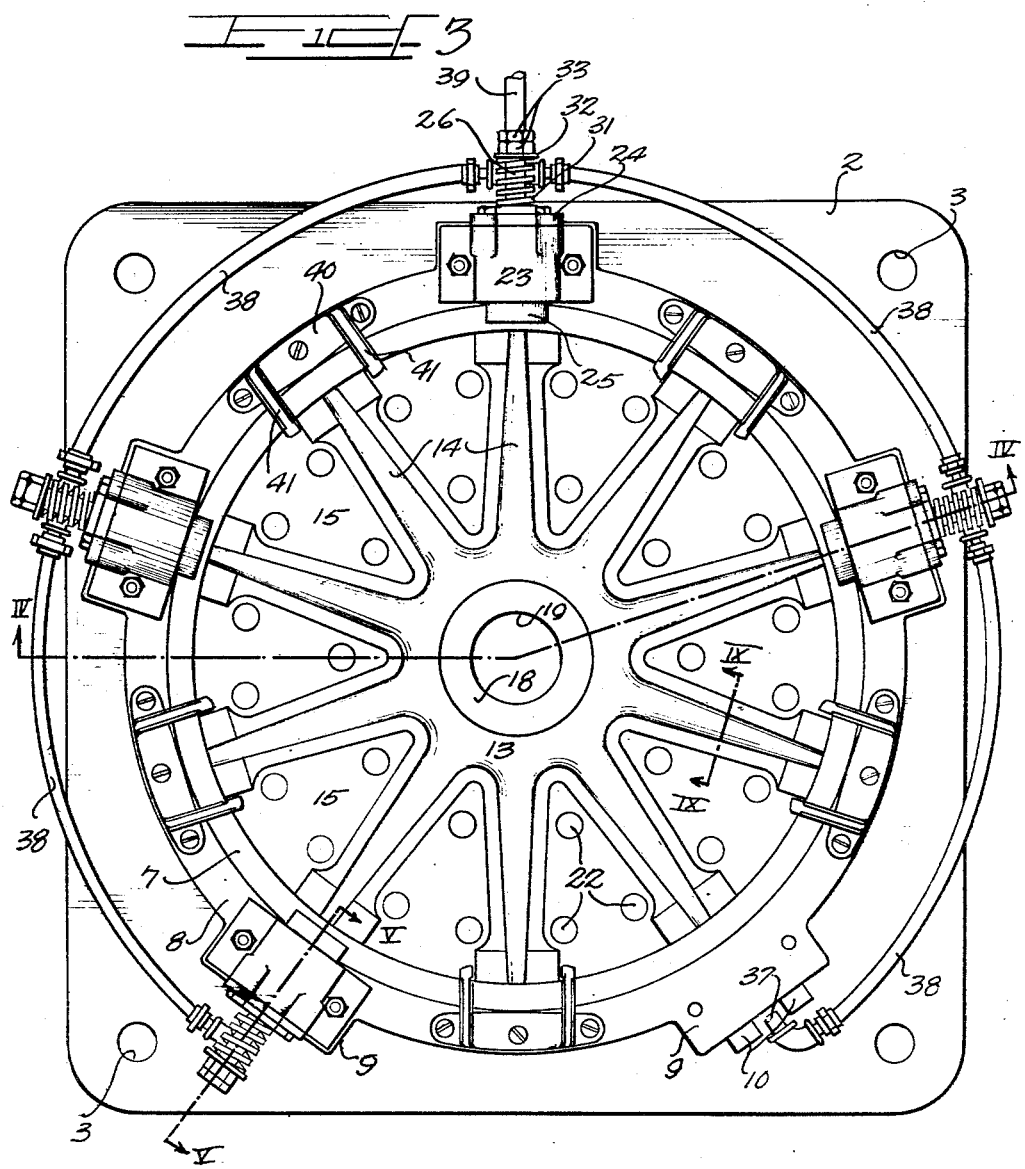

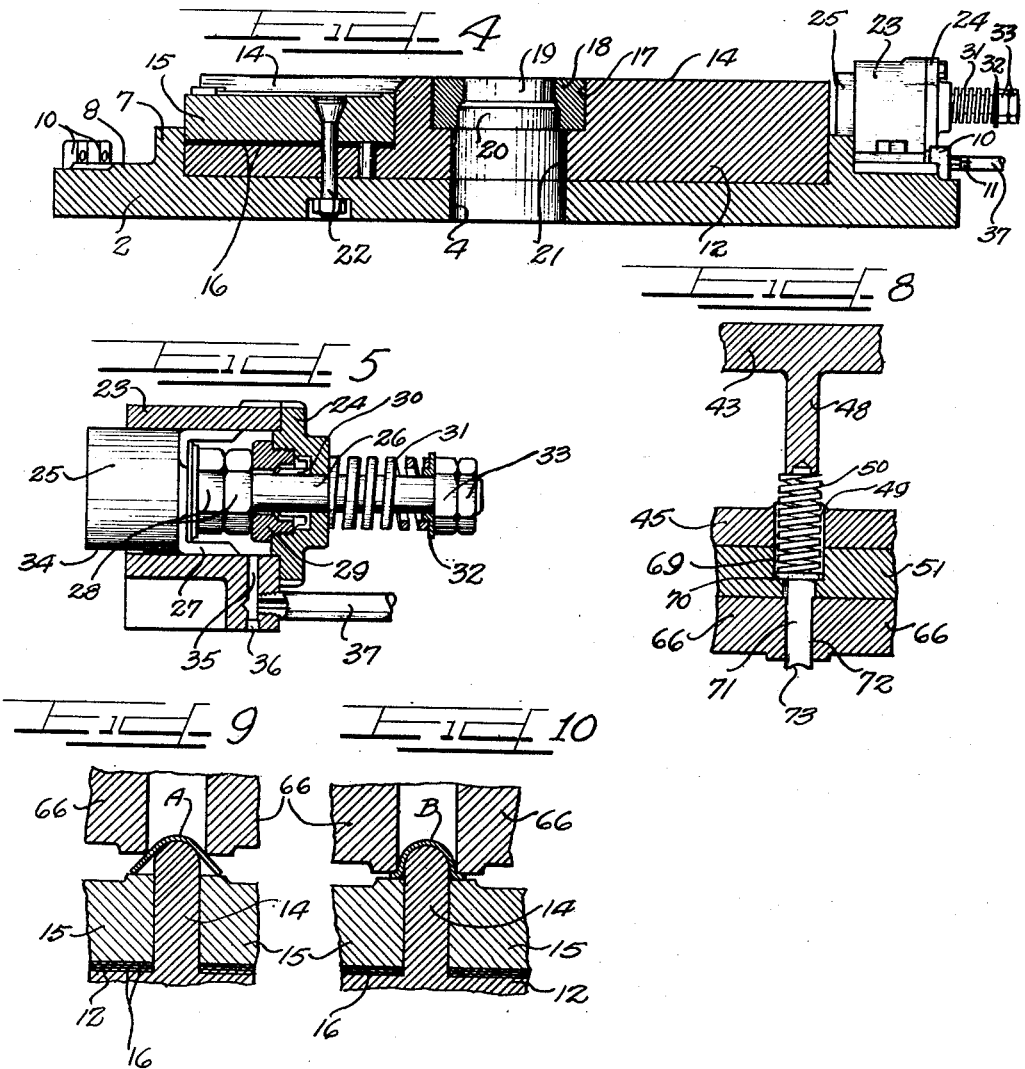

1,571,673

UNITED STATES PATENT OFFICE.

AMES R. JAYNE, OF CHICAGO, ILLINOIS, ASSIGNOR TO AMERICAN STEEL WHEEL CORPORATION, OF CHICAGO, ILLINOIS, A CORPORATION OF ILLINOIS.

AUTOMOBILE WHEEL-FORMING PUNCH AND DIE.

Application filed February 27, 1925. Serial No. 11,914.

*To all whom it may concern:*

Be it known that I, AMES R. JAYNE, a citizen of the United States, and a resident of the city of Chicago, in the county of Cook and State of Illinois, have invented certain new and useful Improvements in an Automobile Wheel-Forming Punch and Die; and I do hereby declare that the following is a full, clear, and exact description of the same, reference being had to the accompanying drawings, and to the numerals of reference marked thereon, which form a part of this specification.

Heretofore automobile and automobile wheel manufacturers have ignored the production of formed stampings for steel artillery type automobile wheels due to the excessive cost resulting from the large number of operations required to produce the finished automobile wheel half sections. Earlier methods have required at least twelve distinct operations to produce a formed wheel half from a wheel blank. The first operation required was the enlargement of the center hole to the required diameter, after which ten distinct operations were required to separately form each of the individual spokes comprising the half wheel section. After the individual forming of each of the spokes, a twelfth or trimming operation was required in order to make the two wheel halves register perfectly at their edges. Owing to the separate forming of each of the spokes of the wheel sections, the finished wheel half was usually lumpy, uneven and untrue.

The present invention relates more particularly to an improved rapid production automobile wheel forming punch and die mechanism adapted to rapidly and accurately produce formed artillery type automobile wheel halves and the like in but a single operation, thereby not only rapidly producing automobile wheel halves but also maintaining an exceedingly low cost of production.

It is an object of this invention to provide an improved rapid production automobile wheel forming punch and die mechanism having self centering, adjustable and regrinding features whereby said punch and die mechanism is adapted to rapidly produce clear and clean pressed automobile halves with but a single operation of the punch and die mechanism.

It is also an object of this invention to provide an improved forming punch and die mechanism adapted to automatically center a wheel blank both radially and circumferentially and producing in but a single operation a properly formed automobile wheel half with its center hole punched out and properly broached and having all of the spokes uniformly formed.

It is a further object of this invention to produce a rapid production automatic wheel forming punch and die mechanism which is adjustable with respect to varying the depth of the spoke corrugations and which is furthermore adjustable in regard to varying the diameter of the punched center hole to produce formed wheel halves having center holes of the required diameters to meet the hub conditions of the various automobile manufacturers.

It is furthermore an object of this invention to provide an automobile wheel forming punch and die mechanism which, owing to its adjustable features, eliminates the use of a plurality of sets of punch and die devices which would ordinarily be required on account of variations in the diameters of center holes and in the depth of the spoke corrugations.

Another object of the invention is to provide an automatic automobile wheel forming punch and die mechanism wherein the hardened tool steel die blocks and punch blocks may be readily reground without removal from the punch and die mechanism, thereby causing long life of the punch and die block parts.

Still another object of the invention is the production of an automatic automobile wheel forming punch and die mechanism adapted to automatically punch and form an automobile wheel half, which, during the forming operation, is so moved that the objectionable sharp edges produced during a previous blank producing operation are removed, thereby producing a clean pressed automobile wheel half without resorting to the customary filing and sand-blasting finishing operations forming part of the earlier methods of producing metal wheel half sections.

It is an important object of this invention to provide an automobile wheel forming punch and die mechanism of comparatively simple construction and arranged so that a wheel stamping blank may be punched to afford a properly broached center hole simultaneous with the automatic forming of all of the spokes of said blank and the finishing of the edges of said spokes.

Other and further important objects of this invention will be apparent from the disclosures in the specification and the accompanying drawings.

This invention is illustrated in the drawings and hereinafter more fully described.

On the drawings:

Figure 1 is a vertical section through a rapid production punch and die automobile wheel forming mechanism embodying the principles of this invention and illustrating the punch mechanism in its up-stroke position above an automobile steel wheel blank placed in position upon a die mechanism and ready to have an automobile wheel half section formed from the blank.

Figure 2 is a similar section of the punch and die mechanism with the punch in its down-stroke position coacting with the die to form the automobile wheel blank into an automobile wheel half.

Figure 3 is a top plan view of the automobile wheel forming die.

Figure 4 is a detail section of the die mechanism taken on line IV—IV of Figure 3.

Figure 5 is an enlarged detail section partly in elevation taken on line V—V of Figure 3.

Figure 6 is a bottom plan view of the punch mechanism.

Figure 7 is a transverse detail section on the punch mechanism taken on line VII—VII of Figure 6.

Figure 8 is a fragmentary detail section of the punch mechanism taken on line VIII—VIII of Figure 7.

Figure 9 is an enlarged fragmentary detail section taken on line IX—IX of Figure 3 showing the cooperation of the punch and die mechanisms on a spoke of the wheel blank with said spoke illustrated in a partly formed position.

Figure 10 is a similar fragmentary section of the punch and die mechanisms showing the punch in its lowermost position with the wheel spoke properly formed.

As shown on the drawings:

The reference numeral 1 indicates an automobile wheel blank having a hub portion and integral radial spokes of a form similar to that produced by the "punch and die construction" illustrated and described in my copending application for patent, filed November 12, 1924, Serial No. 749,480. The present invention embraces a punch and die forming mechanism adapted with but a single operation of the punch mechanism to punch and simultaneously form the wheel blank 1 into a complete finished automobile wheel half.

The improved die mechanism forming a part of this invention consists of a heavy cast steel base 2, each of the corners of which is provided with an opening or aperture 3. The holes 3 in the base plate are provided for the reception of retaining bolts, which serve to fasten the base to the platen 6 of a hydraulic or mechanical press. The base plate is also provided with a center opening or hole 4 to provide an outlet for punchings. The center opening 4 in the base plate 1 is positioned above an outlet opening 5 in the platen 6. Integrally formed on the upper surface of the base 1 is a circular flange or circumferential ring 7. Also integrally formed on the upper surface of the base 1 at the outside of the circular flange 7 is an annular ring or boss 8 having a plurality of radial projections 9, as clearly illustrated in Figure 3. Also integrally formed on the upper surface of the base 1 adjacent the outer end of the boss extensions 9 are a plurality of pairs of screw blocks or stop members 10, each being provided with a threaded opening for receiving an adjusting screw 11.

A circular die steel spoke crimper disk 12 is seated upon the base plate 1 and fits within the circular recess formed by the flange 7. Integrally formed on the top of the die steel crimper disk 12 is a forming die spider comprising a hub section 13 and a plurality of radially directed spoke forming arms or crimper arms 14, all of which are carefully milled as to shape and depth. As illustrated in Figure 3, the spider is provided with ten radial forming arms 14. Any number of arms, of course, may be provided on the die disk 12, depending upon the number of spokes which are to be formed. The spoke forming arms or crimpers 14 are equidistantly spaced and provided therebetween with a plurality of triangular pockets or recesses for receiving hardened tool steel male flanging blocks 15. Removable steel shims 16 are placed beneath the flanging blocks 15 for the purpose of adjusting the depth of the spoke corrugations. It will, of course, be understood that if said shims are not needed they may be removed and the die mechanism used without the same. The hub portion 13 of the forming spider is provided with a central recess 17 into which is fitted a removable hardened tool steel punch die ring 18 which is exchangeable for others having smaller or larger central openings to suit the particular requirements of the hubs of the wheels in the process of manufacture.

The die ring 18 is provided with a punch opening 19, the lower portion 20 (Figure 4) of which is slightly larger in diameter than the upper portion 19. The lower end of the die ring opening 19—20 is disposed directly over an opening 21 provided in the center of the spoke crimper disk 12. The hole 21 registers with the hole 4 in the base 1 and together with the opening 5 in the platen 6 afford an outlet for punchings. The flanging blocks 15 are provided with a plurality of passages for receiving retaining bolts 22 the heads of which are counter-sunk in said blocks to permit the upper face of said blocks to be reground without disturbing the bolt heads. The retaining bolts 22 project through openings in the spoke crimper disk 12 and through openings provided for the purpose in the base 2. It will thus be seen that the bolts 22 rigidly secure the flanging blocks and the spoke crimper disk and spider securely in position upon the base 2 within the recess afforded by the flange 7. The particular arrangement of the flanging blocks 15 between the spoke portions 14 of the forming spider afford a construction wherein the bolts 22 are relieved of all shearing strains.

For the purpose of automatically centering the wheel blanks 1 on the die mechanism, a plurality of radially positioned centering mechanisms are provided upon the projections 9 of the annular ring 8. Each of the centering mechanisms comprises a centering cylinder or housing 23 which abuts against the outer periphery of the ring flange 7. Each of the air cylinders 23 is provided with a cover 24 removably bolted against its outer end while projecting from the inner end of each of said cylinders 23 is a hardened steel plunger 25. Integrally formed on the inner end of the plunger 25 is a plunger rod 26 which projects through the cylinder 23 and through a center opening in the cover 24. Held in position against the inner end of the plunger 25 is a leather washer cup 27 by means of a pair of nuts 28 (Figure 5). Threaded into a threaded opening in the inner face of each cylinder cover 24 is a bronze gland nut 29 which serves to hold a leather packing member 30 within said cover around the plunger rod 26 thereby providing an air-tight joint. Engaged around the projecting end of each of the plunger rods 26 is a tempered steel spring 31 held in place by means of a washer 32 and a pair of adjusting nuts 33. The control springs 31 on the plunger rods 26 serve to return the respective plungers 25 to their neutral or release positions upon release of the air pressure in the cylinders 23. The stroke of the plungers 25 is short and predetermined by the lock nuts 28 and by the gland nuts 29. The outward strokes of the plungers 25 are limited by the outer ends of the spoke arms 14 of the spoke crimper disk 12. The lower portion of each of the plungers 25 is cut away or flattened down sufficiently to afford a flat guide surface, as indicated by the reference numeral 34 (Figure 5) to permit the respective plungers to have a flat sliding contact with the upper face of the base flange 7. This construction of the plungers 25 obviates turning of the plungers and consequently always presents the outer ends of the plungers 25 to the respective outer ends of the spoke portions of the wheel blank 1 thereby automatically centering said wheel blank as clearly illustrated in Figure 1 of the drawings.

As shown in Figure 3 there are five centering plungers 25 spaced equi-distantly apart and adapted to coact with alternate spoke members of the wheel blank 1 so that the wheel blank may be properly centered before a forming operation takes place. The centering plungers 25 are operated by air pressure and, as clearly illustrated in the detail showing in Figure 5 of the drawings, each of the plunger cylinders or housings 23 is provided with a combined air inlet and outlet passage 35 near the cover 24. The inner end of the air passage is clear of the cup packing 27. The air inlet and outlet passage 35 is provided in the lower part of the cylinder 23 to afford a proper drainage outlet for possible moisture in the air pressure system. The lower end of each of the air inlet and outlet passages 35 is closed by means of a removable plug 36. Securely threaded into the lower outer end of each of the air pressure cylinders 23 is an air pipe 37. All of the radially directed air pipes 37 are connected together by means of a plurality of armored flexible hose sections 38, as clearly illustrated in Figure 3. The various hose sections 38 are connected with a common air pipe 39 which in turn is connected with any suitable type of air control or operating valve (not shown). The operating valve may be of a small common standard type and may be actuated by an adjustable eccentric fastened to the master gear shaft of a mechanical press when used, or to the ram in case a hydraulic press is used. The air pressure cylinders 23 are rigidly fastened upon the projections 9 of the base ring 8 by means of stud bolts or other suitable means and by the additional set screws 11, which are supported in the clamping blocks 10 hereinbefore described. The air pressure cylinders are thus rigidly held in position against any possible dislocation of the centering plungers 25.

For the purpose of circumferentially centering or locating the wheel blanks 1 upon the die mechanism, a plurality of locators are provided properly spaced between the respective air pressure cylinder mechanisms. The circumferential locators are supported upon the flange ring 8 of the base 2, as clearly illustrated in Figure 3. Each of the circumferential locators comprises an apertured base or foot 40 upon which are integrally formed a pair of curved arms or elbows 41 which are properly spaced apart to permit the tip end of one of the spoke arms of the blank 1 to fit therebetween so that when the wheel blank is in position the same will be circumferentially located with the respective spoke portions of the wheel blank positioned over the exact center line of the spoke crimper arms 14. The circumferential locators 40 are rigidly fastened to the flange ring 8 by counter-sunk head bolts or other suitable means.

Figures 1, 2, 6 and 7 illustrate the improved punch mechanism of this invention. The improved punch mechanism is adapted to be rigidly fastened to the under face of a ram 42 of a hydraulic or mechanical punch press. Positioned against the under face of the ram 42 is the upper flange 43 of an adapter block or casting 44 which is also provided with a lower flange 45. The upper adapter flange 43 is provided with a plurality of equi-distantly spaced openings or passages 46 for the reception of retaining bolts 47 which hold the adapter block secured to the lower face of the ram 42. Integrally formed on the adapter block 44 between the flanges 43 and 45 are a plurality of radially directed ribs or web plates 48 the center lines of which are positioned to register with the center lines of the spoke crimpers or forming arms 14 of the die mechanism. Each of the ribs 48 of the adapter block 44 is provided with a hole or recess 49 which opens through the bottom of the lower flange 45 of the adapter block and has seated therein a coiled control spring 50. The holes or recesses 49 where they project into the lower portions of the webs 48 are of sufficient size to cut through the side walls of said webs and afford openings for lubricating purposes.

The punch mechanism proper comprises a circular cast steel cage or plate 51 provided with a circle of equi-distantly spaced holes or passages 52 which are adapted to receive bolts 54 which serve to rigidly hold the punch cage 51 secured in position against the bottom face of the lower adapter flange 45. Integrally formed on the middle portion of the upper face of the punch cage 51 is a shank or hub 55 which projects upwardly into a recess 56 formed in the middle portion of the adapter block 44. A cup shaped recess 57 is provided in the lower middle portion of the punch cage 51 and its hub portion 55 and serves as a housing for the upper end of a heavy tempered steel stripper spring 58. The stripper spring 58 surrounds a master center punch and broach 59 with the upper portion of said spring floating or resting upon a pair of projecting studs 60 (Figure 7) which are radially secured in the master punch and broach 59. The master center punch is provided with an integral flange 61 immediately below a shank portion 62. The shank 62 of the master punch and the flange 61 are adapted to fit in suitable openings provided for the purpose in the hub 55 of the punch cage 51. The upper projecting end of the master punch shank 62 is threaded and projects into an opening 63 provided in the adapter block 44. A nut 64 is threaded on the upper end of the master punch shank 62 and serves to rigidly hold the master punch secured in position to the punch cage, as illustrated in Figure 7. The recess 57 in the punch cage is made sufficiently large in diameter to allow for enlargement of the stripper spring 58 when it becomes necessary to change the master punch 59 and the corresponding die ring 18 for others adapted to suit the hub conditions of wheels to be formed to meet the requirements of the automobile wheel manufacturer's standard hubs.

Integrally formed on the bottom face of the punch cage 51 is a ring flange 65. Seated in the recess afforded by the flange ring 65 are a plurality of hardened tool steel flanging female blocks 66 the center lines of which are positioned to register with the center lines of the male flanging blocks 15 of the die mechanism. The female flanging blocks 66 are equi-distantly spaced in the recess formed by the flange ring 65 and relieve the holding bolts 67 of shearing strains created by the action of the punch mechanism. The punch block retaining bolts 67 project through apertures in the block 66 and through apertures provided in the punch cage 51, as clearly illustrated in Figure 7. The conical heads of the bolts 67 are counter-sunk in the lower face of the female flanging blocks 66 thereby affording an arrangement permitting many regrindings of said flanging blocks without disturbing the heads of the bolts 67. Each of the female flanging blocks 66 is provided with a slot or notch 68 in the arc shaped end thereof thereby affording a pair of openings, as shown in Figure 6, whereby said blocks are permitted to clear the upper ends of the locator arms 41 on the down stroke of the punch mechanism.

The upper portion of the die cage 51 is provided with a plurality of recesses 69 which register with the recesses 49 in the webs of the adapter block 44. The lower portion of each of the recesses 49 is smaller in diameter than the upper portion. Seated in each of the recesses 69 in the punch cage 51 is the upper flanged end 70 of an independent expeller or stripper plunger 71.

Each of the expellers or stripper plungers 71 have flattened side surfaces 72 to prevent turning of said strippers and permitting said strippers to have sliding engagement in the recesses 69 formed in the punch cage 51. The lower end of each of the strippers 71 is slightly concave at 73, as indicated in Figure 8. The stripper plungers 71 are positioned between the female flanging blocks 66 near the flange ring 65 and on the exact center line of the respective spoke crimpers or forming arms 14 of the die mechanism.

The spoke portions of the wheel blank 1 when placed upon the die mechanism are normally flat, as indicated in Figure 1. Figure 9 is an enlarged fragmentary detail section and clearly illustrates one step in the forming of a wheel spoke, which, when the punch blocks 66 descend and engage opposite margins of one of the wheel spokes to cause said spoke to be bent into the shape indicated by A (Figure 9) over one of the die forming arms 14 with the lower marginal edges of the respective spoke contacting the upper face of portions of the die blocks 15. Further lowering of the punch block 66 into the position illustrated in Figure 10 causes the marginal edges of the respective spoke to be frictionally drawn inwardly over the surface of the die blocks 15 thereby causing the edges of the spokes being formed to be ground or smoothed off as the spokes are formed into the shape B over the forming arm 14 of the die mechanism. It will thus be noted that with the forming of the spokes of the wheel blank by the punch and die blocks as just described, the edges of said spokes are removed thereby eliminating sharp edges due to the dragging effect under pressure of the margins of the spokes during a forming operation.

The operation is as follows:

With the punch and die mechanisms hereinbefore described associated with one another as illustrated in Figure 1, the punch mechanism is in its elevated or open position thereby permitting a flat punched out vehicle wheel blank 1 to be placed upon the die mechanism with the tips or ends of alternate spokes positioned between the circumferential locator arms 41 thereby affording an arrangement wherein the spokes of the wheel blank have the center lines thereof positioned directly above the center lines of the radial forming arms 14 of the die mechanism. The control lever of the hydraulic or mechanical punch press may now be operated to cause the punch mechanism to be lowered simultaneous with the operation of the air control valve governing the flow of air from the main supply pipe 39 into the auxiliary pipe sections 38 of the die mechanism. Air is thus automatically admitted into the air cylinders 23 causing the centering plungers 25 to be automatically projected against the action of the control springs 31 which are compressed. The centering plungers 25 thus operate automatically at a predetermined time in the descent of the punch mechanism so that the plungers engage against the tips of alternate spokes of the wheel blank to automatically cause the wheel blank to be shifted as required so that said wheel blank will be properly centered directly above the die forming members. It will thus be noted that the wheel blank is properly centered both circumferentially and radially upon the die mechanism. As the punch mechanism is lowered the main stripper spring 58 first comes into contact with the hub portion of the wheel blank to hold the same resiliently pressed against the die ring 18. With this operation the lower end of the master punch 59 engages the middle portion of the wheel blank and automatically punches out a disk from the center of the wheel blank and at the same time broaching the center hole thus formed. The punched out disk is adapted to fall through the registering discharge openings 21, 4 and 5.

At the time the master punch acts to punch out the center hole of the wheel blank, the various independent strippers or plungers 71 contact the respective spokes of the wheel blank just previous to the time that the female forming blocks 66 of the punch mechanism are brought into engagement with the margins of the wheel blank spokes. With the continued descent of the punch mechanism from the position shown in Figure 9 to that illustrated in Figure 10, the spokes of the wheel blank are all simultaneously formed over the spoke forming member 14 of the die mechanism resulting in a consequent dragging of the lower marginal edges of said wheel blank spokes over the upper face of the respective male forming blocks 15 of the die mechanism. This dragging effect under pressure causes automatic rounding off and elimination of the sharp edges of the wheel blank spokes during the time that said wheel blank spokes are being automatically formed into the shape illustrated at B in Figure 10. With the completion of the forming of the wheel blank spokes and the hub portion of the wheel blank all forming is finished and the punch mechanism and ram begin their return stroke thereby causing the air control valve to again be operated to permit release of the air pressure within the cylinders 23, at which time the compressed control springs 31 act automatically to pull the centering plungers 25 back into the cylinders 23 out of engagement with the ends of the respective formed spokes of the completed wheel half. With the return stroke of the ram and the punch mechanism the main stripper spring 58 and the individual spring controlled spoke strippers or plungers 71 act to automatically strip the hub portion of the formed wheel half and the individual formed spokes from the receding master punch 59 and the respective female flanging blocks 66 of the punch mechanism.

The completely formed vehicle wheel half with its properly punched and broached center hole and with the formed spoke edges rounded and finished, may now be removed from the die mechanism and a new wheel blank inserted in place thereof ready for the next cycle of operations.

Attention is called to the fact that the improved punch and die forming mechanism of this invention is adapted to act to rapidly produce with a single operation of the punch mechanism a properly formed vehicle wheel half having a center hole punched therein and broached and the edges of the spokes finished simultaneously with the forming of the hub portion and the spokes of the vehicle wheel half. Perfectly formed vehicle wheel halves are readily produced at a reduced cost due to the fact that the wheel blanks are both circumferentially and radially centered upon the die mechanism before the punching and forming of the wheel blank takes place.

Attention is also directed to the improved arrangement whereby the punch forming blocks 66 and the die forming blocks 15 may be repeatedly reground when necessary without disturbing the retaining bolts which hold said blocks in their respective positions.

The punch and die mechanisms are also arranged to receive die rings 18 of different sizes as well as center punches 59 of different diameters in order that the punch and die mechanisms may be readily adapted for use to produce formed wheel halves having centrally punched hub sections of any desired size to meet the requirements of various automobile manufacturers.

By the inserting or removing of the shims 16 below the die punch blocks 15 the depth of the spoke corrugations may be increased or decreased as desired for the purpose of forming complete wheel halves for light or heavy wheel constructions.

Owing to the various adjustments of the improved punch and die mechanisms only one set of punch and die mechanisms is required for the purpose of producing formed wheel halves of different sizes to meet manufacturers' requirements thereby affording an improved punch and die mechanism adapted to produce formed wheel halves at a low cost and furthermore resulting in a consequent great economy in manufacture due to the fact that the adjustable features of the improved punch and die mechanism obviates the use of a plurality of punch and die mechanisms for different sizes of wheel halves required in commercial use by different automobile manufacturers.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

1. A rapid production vehicle wheel forming device comprising a die mechanism and a punch mechanism for coaction therewith, pneumatic means associated with said die mechanism for automatically centering a vehicle wheel blank both circumferentially and radially on said die mechanism, means on said punch mechanism for simultaneously punching a center hole in the wheel blank and forming the spokes of said wheel blank to provide a finished wheel half, and a plurality of spring controlled strippers on the punch mechanism to strip the wheel half therefrom.

2. The combination with a die mechanism adapted to support a vehicle wheel blank, pneumatic centering means on said die mechanism, a punch mechanism adapted to be operated to cause the wheel blank to be punched and formed with but a single operation of the punch mechanism, said pneumatic means controlled by the operation of said punch mechanism to cause automatic centering of the wheel blank on the die mechanism previous to the forming and punching operation.

3. A rapid production punch and die forming device comprising a punch mechanism, a plurality of punch blocks secured thereto, a die mechanism, a plurality of die blocks secured thereto, means on the die mechanism to permit circumferential centering of the wheel blank on the die mechanism, automatic means on the die mechanism for radially centering said wheel blank, a master punch carried by the punch mechanism for punching a hole in the wheel blank simultaneous with the forming of the hub and spokes of said wheel blank between the punch blocks, and a plurality of stripper mechanisms carried by the punch mechanism adapted to automatically strip the formed wheel half from the punch blocks after a punching and forming operation of the punch mechanism.

4. A rapid production punch and die device comprising a flanged base, a forming spider seated therein, die blocks on said forming spider, means for securing the die blocks and said spider rigidly to said base, a forming ring carried by said spider, circumferential centering means on said base adapted to permit circumferential centering of a wheel blank on said spider, pneumatic centering means on said base for causing radial centering of the wheel blank on said spider, a ram, an adapter rigidly secured thereto, a punch cage rigidly secured to said adapter, a master punch carried by said punch cage, a stripper spring supported on said master punch, a plurality of punch blocks secured to said punch cage for coaction with said die blocks, and a plurality of spring controlled individual strippers supported by said punch cage and adapter between said punch blocks.

5. The combination with a rapid production punch mechanism, of a die mechanism, circumferential blank centering means on said die mechanism, radial blank centering means on said die mechanism adapted to be controlled by the operation of said punch mechanism, means carried by the punch mechanism for punching and broaching a hole in a centered blank on said die mechanism, and a plurality of strippers carried by the punch mechanism adapted to automatically strip a formed wheel half from the punch mechanism and said means when said punch mechanism recedes.

6. The combination with a rapid production punch mechanism, of a die mechanism for coaction therewith, said die mechanism comprising a base, a forming spider supported on said base, die blocks removably supported on said forming spider, and shims between said spider and said die blocks to permit variations in the depth of the corrugations formed in a blank operated on by said punch and die mechanism.

7. In a rapid production punch and die device, the combination with a die base, of a die spider supported thereon, die blocks supported on said die spider, shims removably supported on the said spider beneath said die blocks, a die ring removably supported in said spider, centering means on said base for centering a blank on said spider and die ring, and a punch mechanism adapted with a single operation thereof to automatically act on said blank to simultaneously punch and form said blank into a finished wheel half.

8. The combination with a die mechanism adapted to support a wheel blank in a centered position, of a punch device comprising an adapter adapted to be secured to the ram of a press, a punch cage rigidly secured to said adapter, punch blocks secured to said punch cage, a master punch carried by said punch cage, a master stripper spring supported on said master punch, and a plurality of spring controlled individual strippers supported by said punch cage.

9. The combination with a die mechanism adapted to support a blank, of pneumatic means for centering said blank on the die mechanism, a punch mechanism for coaction with said die mechanism, control means for said centering means adapted to be governed by the operation of said punch mechanism, operating means for said punch mechanism adapted to cause said punch mechanism with but a single operation to coact with said die mechanism to form a complete wheel half from the centered blank on said die mechanism, and stripper means carried by said punch mechanism adapted to act automatically to strip the formed wheel half from said punch when the punch mechanism recedes.

10. The combination with a die mechanism adapted to support a wheel blank, of a pneumatic centering means on said die mechanism for automatically centering the wheel blank, of a punch mechanism adapted to coact with said die mechanism to form the wheel blank into a complete wheel half with but a single operation of said punch mechanism, said punch mechanism adapted with a down stroke thereof to automatically actuate said centering means on the die mechanism to cause centering of the wheel blank and furthermore adapted with the receding of said punch mechanism to automatically release said centering means.

11. In an automobile wheel forming punch and die device of the class described, the combination with a die mechanism, of means for automatically centering a wheel blank thereon, die blocks forming a part of said die mechanism, means removably mounted below said die blocks to permit the same to be raised or lowered to vary the depth of corrugations formed in the wheel blank, and a punch mechanism for coaction with said die mechanism adapted with but a single operation to form the wheel blank into a wheel half.

12. In a punch and die forming device of the class described, the combination with a punch mechanism, of a die mechanism comprising a flanged base, a forming spider supported on said flanged base, a die ring in said forming spider, die blocks secured to said forming spider, and removable shims beneath said die blocks adapted to permit variations in the depth of corrugations produced in a wheel half formed from a wheel blank operated on by said punch and die mechanisms.

13. In a punch and die forming device of the class described, the combination with a punch mechanism, of a die mechanism for coacting therewith comprising a flanged base, a forming die spider on said base, die blocks carried by said forming spider, means positioned between said forming spider and die blocks for varying the depth of corrugations produced by the punch and die mechanisms in a wheel blank, a plurality of equi-distantly spaced pneumatic radially acting centering means for radially centering a blank on said spider, and a plurality of circumferential centering means mounted on said base between the pneumatic centering means for centering the wheel blank circumferentially.

14. In a punch and die automoble wheel half forming device of the class described, the combination with a die mechanism adapted to support a wheel blauk, means for centering the wheel blank both circumferentially and radially on said die mechanism, a punch mechanism for coaction with said die mechanism adapted with a single operation to form a wheel half from said wheel blank, a master punch carried by the punch mechanism adapted to simultaneously punch and broach a hole in the wheel blank, and a stripper spring supported on said master punch adapted to removably engage and strip the punched wheel half from the master punch when the punch mechanism recedes.

15. In a punch and die forming device of the class described, the combination with a die mechanism adapted to support a wheel blank, of means for centering the wheel blank on the die mechanism, of a punch mechanism adapted to be actuated to cause with but a single operation the formation of a wheel half from said wheel blank, a master punch carried by the punch mechanism adapted to punch and broach a hole in the hub portion of the wheel blank, a stripper spring supported on the master punch for stripping the hub portions of the wheel blank from the master punch when the punch mechanism recedes, and a plurality of independent spring controlled strippers supported by the punch mechanism to individually strip the formed spokes of the wheel half from the punch mechanism when it recedes.

16. In a punch and die forming device of the class described, the combination with a die mechanism, of a forming spider mounted thereon, a die ring removably carried by said forming spider to permit the use of die rings having holes of different diameters therein to be used in combination with said spider, a punch mechanism for coaction with said die mechanism, a master punch removably secured to said punch mechanism adapted to coact with said die ring to punch and broach a hole in a blank on said die mechanism, said master punch being removable for the purpose of permitting master punches of different diameters to be used with the punch mechanism for coaction with the complemental die ring on said die mechanism.

17. In a punch and die mechanism of the class described, the combination with a die mechanism adapted to support a blank, of a punch mechanism for coaction therewith to form the blank, a master punch actuated by said punch mechanism adapted to punch and broach a hole in said blank while being formed by the die and punch mechanisms, and a stripper spring floatingly supported on said punch to strip the formed blank from the master punch when the punch mechanism recedes.

In testimony whereof I have hereunto subscribed my name.

AMES R. JAYNE.